US012692134B2

(12) United States Patent
Fukukawa et al.

(10) Patent No.: US 12,692,134 B2
(45) Date of Patent: Jul. 28, 2026

(54) CRANE CONTROL METHOD AND CRANE

(71) Applicant: KOBELCO CONSTRUCTION MACHINERY CO., LTD., Hiroshima (JP)

(72) Inventors: Yuya Fukukawa, Hyogo (JP); Takayoshi Hirate, Hyogo (JP); Shintaro Sasai, Hyogo (JP); Tadahiro Shimizu, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 177 days.

(21) Appl. No.: 18/838,098

(22) PCT Filed: Feb. 14, 2023

(86) PCT No.: PCT/JP2023/004937
§ 371 (c)(1),
(2) Date: Aug. 13, 2024

(87) PCT Pub. No.: WO2023/157828
PCT Pub. Date: Aug. 24, 2023

(65) Prior Publication Data
US 2025/0145425 A1 May 8, 2025

(30) Foreign Application Priority Data
Feb. 17, 2022 (JP) ................................ 2022-022556

(51) Int. Cl.
*B66C 13/48* (2006.01)
*B66C 13/46* (2006.01)
(Continued)

(52) U.S. Cl.
CPC .............. *B66C 13/48* (2013.01); *B66C 13/46* (2013.01); *B66C 23/42* (2013.01); *B66C 23/54* (2013.01);
(Continued)

(58) Field of Classification Search
CPC ..................................................... B66C 13/48
See application file for complete search history.

(56) References Cited

U.S. PATENT DOCUMENTS 8,025,167 B2 * 9/2011 Schneider ............... B66C 13/46 212/276
11,434,112 B2 * 9/2022 Hayashi ................ B66C 23/905
(Continued)

FOREIGN PATENT DOCUMENTS

GB 1 392 223 A 4/1975
JP 48-49151 A 7/1973
(Continued)

OTHER PUBLICATIONS

International Search Report mailed on May 9, 2023 in PCT/JP2023/004937 filed on Feb. 14, 2023 (2 pages).

*Primary Examiner* — Michael A Berns
(74) *Attorney, Agent, or Firm* — Oblon, McClelland, Maier & Neustadt, L.L.P.

(57) ABSTRACT

A storage stores at least one piece of registered correction data including a plurality of registered values associated with a plurality of section angle ranges. A controller executes parallel winch control of causing a derricking winch and a hoisting winch to operate. The controller specifies a reference target value corresponding to a derricking angle, from the plurality of registered values. In a correction period corresponding to a point of time at which a correction operation is detected, the controller corrects the reference target value used for deriving an operation speed of the hoisting winch in the parallel winch control, in
(Continued)

accordance with a specified value specified by the correction operation. The controller updates data of the reference target value corresponding to the correction period to data corrected with the specified value.

10 Claims, 5 Drawing Sheets

(51) Int. Cl.

| | |
|---|---|
| ***B66C 23/00*** | (2006.01) |
| ***B66C 23/42*** | (2006.01) |
| *B66C 13/40* | (2006.01) |

(52) U.S. Cl.
CPC ...... *B66C 13/40* (2013.01); *B66C 2700/0371* (2013.01)

(56) References Cited

U.S. PATENT DOCUMENTS

| | | | | |
|---|---|---|---|---|
| 11,447,372 | B2 * | 9/2022 | Rauscher | B66C 23/16 |
| 11,702,325 | B2 * | 7/2023 | Kanda | B66C 13/08 212/276 |
| 12,030,752 | B2 * | 7/2024 | Minami | G05D 1/43 |
| 2023/0391588 | A1 * | 12/2023 | Maier | B66C 15/065 |
| 2024/0002197 | A1 * | 1/2024 | Sakurai | B66C 13/16 |
| 2025/0122053 | A1 * | 4/2025 | Hyono | B66C 23/82 |
| 2025/0145425 | A1 * | 5/2025 | Fukukawa | B66C 13/46 |

FOREIGN PATENT DOCUMENTS

| | | | |
|---|---|---|---|
| JP | 53-61971 | U1 | 5/1978 |
| JP | 6-115880 | A | 4/1994 |
| JP | 2003-81578 | A | 3/2003 |
| JP | 2021-54554 | A | 4/2021 |

* cited by examiner

CRANE CONTROL METHOD AND CRANE

TECHNICAL FIELD

The present invention relates to a crane control method and a crane for horizontal transfer of a suspended load.

BACKGROUND ART

In a crane, a hoisting rope is connected to a hook and a hoisting winch. The hoisting rope droops from a front end of a boom or from a front end of a jib. As a result of an operation of the hoisting winch, the suspended load suspended from the hook moves up or down.

As a result of an upward turn of the boom or the jib, the suspended load moves slantly upward while moving closer to a main body (e.g., an upper slewing body) of the crane. As a result of a downward turn of the boom or the jib, the suspended load moves slantly downward while moving away from the main body.

At least one of the boom and the jib is an example of a derricking body capable of turning upward and downward. A derricking rope is connected to the derricking body and the derricking winch. As a result of an operation of the derricking winch, the derricking body turns upward or downward.

There is a case where the crane executes an operation for horizontally transferring the suspended load. This horizontal transfer of the suspended load includes horizontal push transfer and horizontal pull transfer.

The horizontal push transfer means horizontally transferring the suspended load in the direction of moving it away from the main body. The horizontal pull transfer means horizontally transferring the suspended load in the direction of moving it closer to the main body.

It is known, for example, that the crane executes control for horizontal transfer of the suspended load (see, for example, Patent Literature 1). Specifically, the crane causes the derricking winch to operate in accordance with an operation applied to an operation lever. At this time, the crane causes the hoisting winch to operate at a speed corresponding to an operation speed of the derricking winch and to an angle of the derricking body.

Under a situation where a control mode different from a normal control mode is selected, the crane executes control for horizontal transfer of the suspended load. This control is suitable for a case where the skill level of the operator is relatively low.

An operation speed of the hoisting winch that is suitable for horizontal transfer of the suspended load may vary, depending on various work situations or types of the crane.

For example, the work situations include not only the angle of the derricking body and the operation speed of the derricking winch but also a rotating speed of an engine that drives a hydraulic pump and the weight of the suspended load. The types of the crane include a crane type, a tower type, a luffing type, and a fixed jib type.

For these reasons, when the crane executes control for horizontal transfer of the suspended load according to pre-adjusted control parameters, the crane is not able to maintain the constant height of the suspended load in some cases.

CITATION LIST

Patent Literatures

Patent Literature 1: JP 2021-54554 A

SUMMARY OF INVENTION

An object of the present invention is to provide a crane control method and a crane that can easily adjust an operation speed of a hoisting winch in control for horizontal transfer of a suspended load.

A crane control method according to one aspect of the present invention is a control method for horizontally transferring a suspended load, using a crane. The crane includes a derricking body, a derricking rope, a derricking winch, an angle detector, a hook, a hoisting rope, and a hoisting winch. A controller includes a derricking operation unit, a correction operation unit, and a nonvolatile storage. The derricking rope is connected to the derricking body. The derricking winch winds up the derricking rope or unwinds the derricking rope to change an angle of the derricking body. The angle detector detects an angle of the derricking body. The suspended load is suspended from the hook. The hoisting rope is connected to the hook, and droops from a front end of the derricking body. The hoisting winch winds up the hoisting rope or unwinds the hoisting rope to change a length of a part of the hoisting rope that droops from the front end of the derricking body. The controller is capable of controlling the derricking winch and the hoisting winch. The derricking operation unit receives an operation that instructs operation of the derricking winch. The correction operation unit receives a correction operation of specifying a specified value for correcting an operation speed of the hoisting winch. The storage stores at least one piece of registered correction data including a plurality of registered values associated with a plurality of section angle ranges. The plurality of section angle ranges are set by dividing a movable range of the derricking body into different sections. The plurality of registered values each represent a degree of correction for adjusting an operation speed of the hoisting winch. The crane control method includes executing, by the controller, parallel winch control of causing the derricking winch and the hoisting winch to operate when an operation on the derricking operation unit is detected in a situation where a control mode for horizontal transfer of the suspended load is selected. The crane control method further includes executing, by the controller, a correction process when the correction operation is detected in a situation where the parallel winch control is executed. The parallel winch control includes causing, by the controller, the derricking winch to operate at a speed corresponding to an amount of operation on the derricking operation unit. The parallel winch control further includes acquiring, by the controller, a derricking angle that is a detection angle detected by the angle detector and specifying a reference target value corresponding to the derricking angle, from among the plurality of registered values. The parallel winch control further includes deriving, by the controller, a reference speed ratio according to the derricking angle, the reference speed ratio representing a ratio of an operation speed of the hoisting winch to an operation speed of the derricking winch. The parallel winch control further includes deriving, by the controller, an applied speed ratio by correcting the reference speed ratio with the reference target value. The parallel winch control further includes causing, by the controller, the hoisting winch to operate at a speed corresponding to an operation speed of the derricking winch and to the applied speed ratio. The correction process includes executing, by the controller, a speed correction process in a correction period corresponding to a point of time at which the correction operation is detected, the speed correction process being a process of correcting the reference target value used for deriving an operation speed of the hoisting winch in the parallel winch control, in accordance with the specified value specified by the correction operation. The correction process further includes executing, by the controller, a data updating process of updating data of the reference target value, the data corresponding to the correction period in the storage, to data corrected with the specified value specified by the correction operation.

The derricking body may be a boom coupled to a main body of the crane so as to be capable of derricking, or a jib connected turnably to a front end of the boom, or both the boom and the jib.

A crane according to another aspect of the present invention includes: the derricking body, the derricking rope, the derricking winch, the angle detector, the hook, the hoisting rope, the hoisting winch, and the controller. The controller includes the derricking operation unit, the correction operation unit, and the storage. The controller implements the crane control method.

According to the present invention, a crane control method and a crane that can easily adjust an operation speed of a hoisting winch in control for horizontal transfer of a suspended load can be provided.

DESCRIPTION OF EMBODIMENTS

Embodiments of the present invention will hereinafter be described with reference to the drawings. It should be noted that the embodiments described below are an example of embodiment of the present invention and are not intended to limit the technical scope of the present invention.

[Configuration of Crane 10]

A crane 10 according to an embodiment is a work machine that lifts a suspended load L0 and that moves the suspended load L0 in its suspended state. As mentioned above, a crane type, a tower type, a luffing type, and a fixed jib type are enumerated as different types of the crane. Hereinafter, an example in which the crane 10 is the tower type will mainly be described. Before the description, however, an outline of each type will be briefly described.

The crane type is, in general, a type of the crane that includes a boom but does not include a jib. The crane type, therefore, carries out work (load suspending work) as a hoisting rope droops from a front end of the boom. In work by the crane type, the boom makes a derricking move with respect to an upper slewing body.

The tower type is a type of the crane in which the position (angle) of the boom relative to the upper slewing body is fixed as the boom remains standing, and a jib makes a derricking move with respect to the boom. In other words, in work by the tower type, the jib makes a derricking move with respect to the boom, but the boom does not make a derricking move with respect to the upper slewing body. A fixed angle of the boom against the upper slewing body is set within a range of, for example, about 60 degrees to 90 degrees.

The luffing type is a type of the crane in which each of the boom and the jib can make a derricking move. In other words, in work by the luffing type, the boom makes a derricking move with respect to the upper slewing body and the jib makes a derricking move with respect to the boom.

The fixed jib type is a type of the crane in which the position (angle) of the jib relative to the boom is fixed, and the boom makes a derricking move with respect to the upper slewing body. In other words, in work by the fixed jib type, the boom makes a derricking move with respect to the upper slewing body, but the jib does not make a derricking move with respect to the boom.

Figure 1:
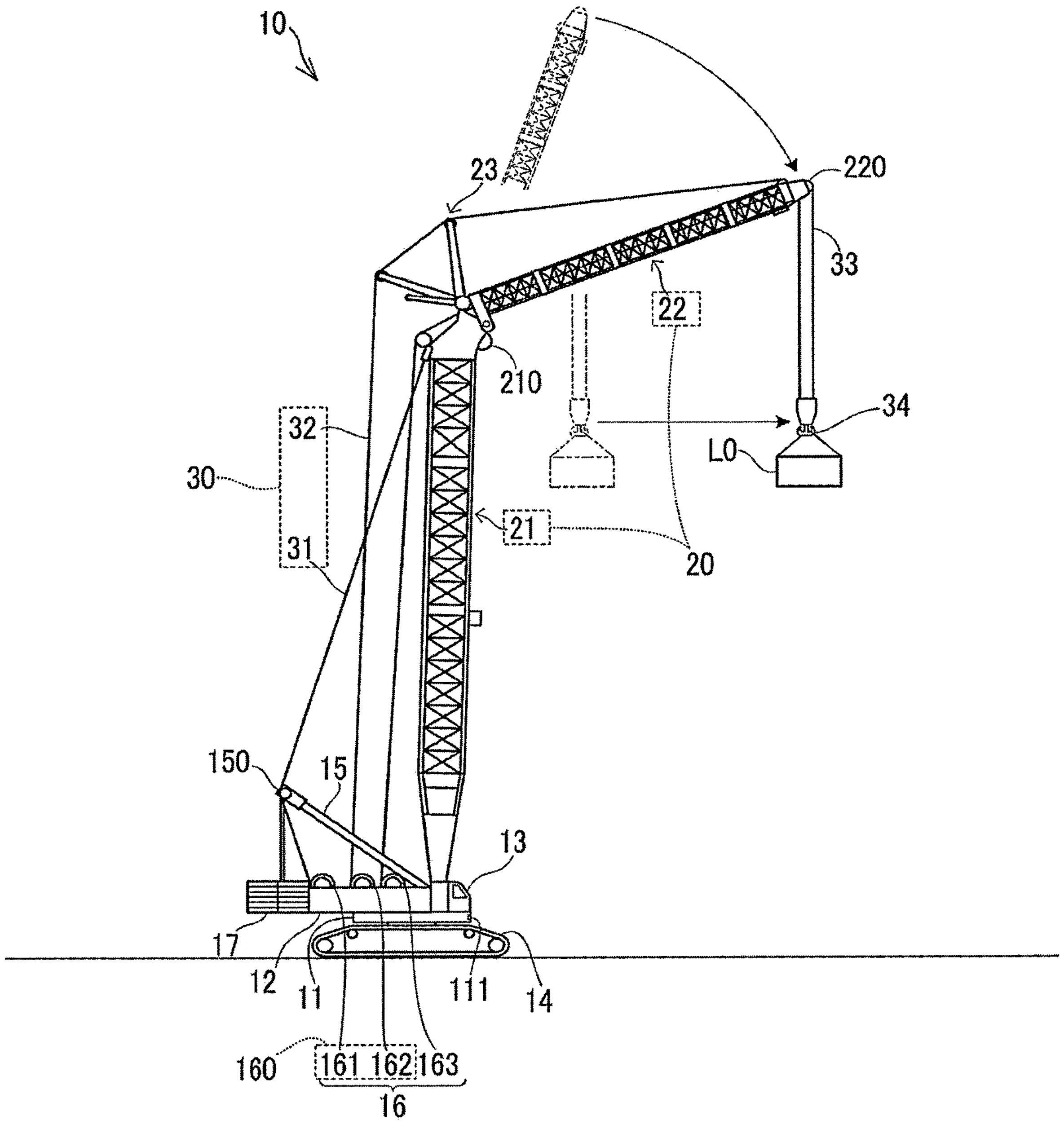
FIG. 1 is a configuration diagram of a crane according to an embodiment.

As shown in FIG. 1, the crane 10 includes a lower travelling body 11, an upper slewing body 12, a cab 13, a gantry 15, a winch device 16, a counterweight 17, a boom 21, a gantry sheave 150, a jib 22, a jib point sheave 220, a strut 23, a hook 34, a first derricking rope 31, a second derricking rope 32, and a hoisting rope 33.

The winch device 16 includes a first derricking winch 161, a second derricking winch 162, and a hoisting winch 163.

The upper slewing body 12 is a slewing body slewably supported by the lower travelling body 11. The upper slewing body 12 is formed integrally with the cab 13 and the gantry 15.

The gantry 15 in its a state of standing up from the upper slewing body 12 is fixed to the upper slewing body 12. The upper slewing body 12 supports the winch device 16, the counterweight 17, and the boom 21.

One or both of the second derricking winch 162 and the hoisting winch 163 may be disposed at the base of the boom 21.

The lower travelling body 11 is a pedestal portion that slewably supports the upper slewing body 12. The upper slewing body 12 is a slewing body that is driven to slew by a driving source (not illustrated) provided in the lower travelling body 11.

The crane 10 shown in FIG. 1 is a mobile crane. The crane 10, therefore, further includes a travelling device 14. The travelling device 14 supports the lower travelling body 11 and is capable of travelling. FIG. 1 shows an example in which the travelling device 14 is a crawler type device.

The lower travelling body 11, the upper slewing body 12, and the travelling device 14 are an example of a main body of the crane 10. The boom 21 is coupled to the main body so as to be capable of derricking.

The cab 13 is a cockpit. The boom 21 has its base coupled to the upper slewing body 12. The boom 21 can derrick on the base coupled to the upper slewing body 12.

The jib 22 is coupled turnably to a front end of the boom 21. The jib 22 can derrick on the base of the jib 22 (the front end of the boom 21).

The strut 23 is disposed on a coupling portion between the boom 21 and the jib 22. The gantry sheave 150 is disposed on a front end of the gantry 15. The jib point sheave 220 is disposed on a front end of the jib 22.

The first derricking rope 31 is put on the gantry sheave 150, and both ends of the first derricking rope 31 are connected to the boom 21 and the first derricking winch 161, respectively. The first derricking winch 161 supports the boom 21 via the first derricking rope 31. The first derricking rope 31 may be referred to as, for example, a boom derricking rope.

The first derricking winch 161 winds up the first derricking rope 31 or unwinds the first derricking rope 31, thereby changing an angle of the boom 21. The operation direction of the first derricking winch 161 is the direction of winding up the first derricking rope 31 or the direction of unwinding the first derricking rope 31. In other words, the operation direction of the first derricking winch 161 is the direction of causing the boom 21 to turn upward or the direction of causing the boom 21 to turn downward.

The second derricking rope 32 is put on the strut 23, and both ends of the second derricking rope 32 are connected to the jib 22 and the second derricking winch 162, respectively. The second derricking winch 162 supports the jib 22 via the second derricking rope 32. The second derricking rope 32 may be referred to as, for example, a jib derricking rope.

The second derricking winch 162 winds up the second derricking rope 32 or unwinds the second derricking rope 32, thereby changing an angle of the jib 22 against the boom 21. The operation direction of the second derricking winch 162 is the direction of winding up the second derricking rope 32 or the direction of unwinding the second derricking rope 32. In other words, the operation direction of the second derricking winch 162 is the direction of causing the jib 22 to turn upward or the direction of causing the jib 22 to turn downward.

The hoisting rope 33 is put on the jib point sheave 220. The hook 34 is hung by the hoisting rope 33. In other words, the hoisting rope 33 is connected to the hook 34 and droops from the front end of the jib 22.

The hoisting winch 163 winds up the hoisting rope 33 or unwinds hoisting rope 33, thereby changing the length of a drooping part of the hoisting rope 33. The dropping part is the part of hoisting rope 33 that droops from the front end of the jib 22.

A change in the length of the drooping part causes the hook 34 to move up or down. The suspended load is hung on the hook 34.

The counterweight 17 is provided to maintain overall balance including the weights of the boom 21, the jib 22, and the suspended load hung on the hook 34.

Figure 2:
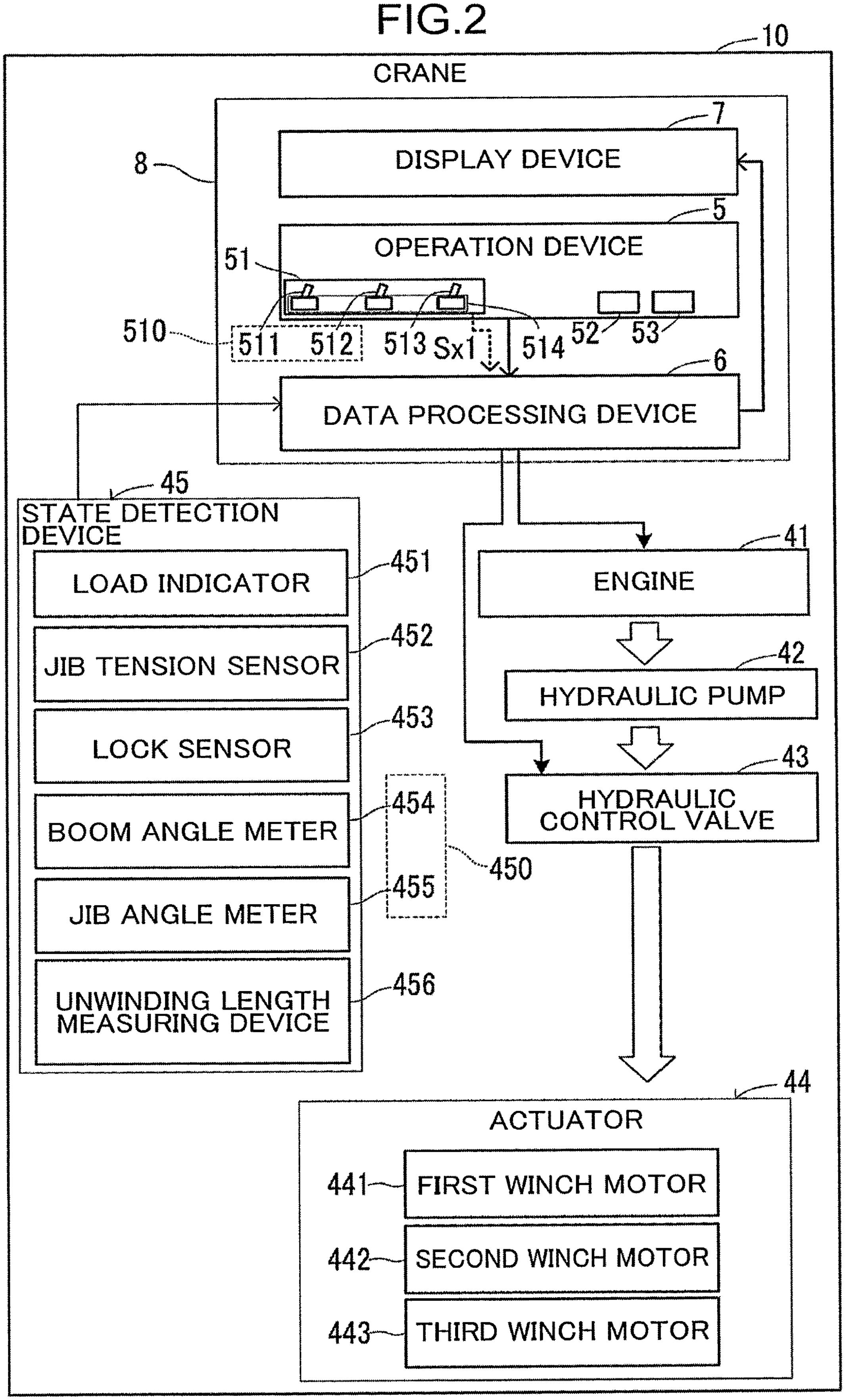
FIG. 2 is a block diagram showing a configuration of control-related equipment of the crane according to the embodiment.

As shown in FIG. 2, the crane 10 includes drive-related equipment including an engine 41, a hydraulic pump 42, a hydraulic control valve 43, and a plurality of actuators 44. Each of the plurality of actuators 44 is a hydraulic actuator.

The crane 10 further includes a controller 8 that controls the plurality of actuators 44 by controlling the hydraulic control valve 43. The controller 8 includes an operation device 5, a data processing device 6, and a display device 7. Input/output devices (human interfaces), such as the operation device 5 and the display device 7, are disposed in the cab 13.

The operation device 5 is a device that receives an operation by an operator. The operation device 5 is an example of an operation unit that receives an operation by a person, such as the operator. The display device 7 is a device that displays information.

For example, the display device 7 is a panel display device, such as a liquid crystal display unit. The operation device 5 includes a plurality of operation devices. The plurality of operation devices include a lever operation device 51, an operation button 52, and an input device 53.

The lever operation device 51 includes a plurality of operation levers 511, 512, and 513. The plurality of operation levers 511, 512, and 513 are each configured to be capable of shifting in position when receiving an operation by the operator. The lever operation device 51 further includes a positional shift detection device 514. The positional shift detection device 514 outputs an operation signal Sx1 indicating a positional shift status of each of the plurality of operation levers 511, 512, and 513.

The operation signal Sx1 represents the direction of positional shift of each of the plurality of operation levers 511, 512, and 513 from its neutral position (home position) and an amount of positional shift of the same from the neutral position. The amount of positional shift from the neutral position is equivalent to the amount of operation applied to each of the plurality of operation levers 511, 512, and 513.

The plurality of operation levers 511, 512, and 513 include a boom operation lever 511, a jib operation lever 512, and a hoisting operation lever 513.

The boom operation lever 511 receives an operation that instructs the operation of the first derricking winch 161. The jib operation lever 512 receives an operation that instructs the operation of the second derricking winch 162. The hoisting operation lever 513 receives an operation that instructs the operation of the hoisting winch 163.

The direction of positional shift of each of the plurality of operation levers 511, 512, and 513 represents an instruction on a winding operation or an unwinding operation of the winch among the plurality of winches 161, 162, and 163 that corresponds to the operation lever making the positional shift. The amount of positional shift of each of the plurality of operation levers 511, 512, and 513 represents an instruction on an operation speed of the winch among the plurality of winches 161, 162, 163 that correspond to the operation lever making the positional shift.

The input device 53 receives information inputted by the operator. For example, the input device 53 may include a touch panel. In this case, the touch panel may be configured as an element separated from the display device 7 or as an element integrated into the display device 7. In addition, the input device 53 may include a device that receives information inputted by the operator through a voice operation.

The crane 10 further includes a state detection device 45. The state detection device 45 detects various states of the crane 10. The state detection device 45 may include a plurality of sensors that detect states of various pieces of equipment included in the crane 10.

Specifically, the state detection device 45 includes a load indicator 451, a jib tension sensor 452, a boom angle meter 454, and a jib angle meter 455. Detection results from the state detection device 45, that is, detection results on various states of the crane 10 are inputted to the data processing device 6.

The load indicator 451 detects the weight of the suspended load L0 hung on the hook 34. The load indicator 451 is an example of a load detector that detects the weight of the suspended load L0. The jib tension sensor 452 detects tension acting on the second derricking rope 32.

For example, the jib tension sensor 452 may include a load sensor, such as a load cell, that is attached to a coupling member connecting the jib 22 to the second derricking rope 32.

The boom angle meter 454 is an example of a boom angle detector that detects an angle of the boom 21. The jib angle meter 455 is an example of a jib angle detector that detects an angle of the jib 22.

For example, the boom angle meter 454 may include an inclinometer attached to the boom 21, in which case the boom angle meter 454 detects an angle that the longitudinal direction of the boom 21 makes against the horizontal direction. In other words, the boom angle meter 454 detects an elevation angle of the boom 21.

Similarly, the jib angle meter 455 may include an inclinometer attached to the jib 22, in which case the jib angle meter 455 detects an angle that the longitudinal direction of the jib 22 makes against the horizontal direction. In other words, the jib angle meter 455 detects an elevation angle of the jib 22.

The state detection device 45 further includes an unwinding length measuring device 456. The unwinding length measuring device 456 is a device that measures an unwinding length of the hoisting rope 33.

For example, the unwinding length measuring device 456 may include a sensor that measures the unwinding length of the hoisting rope 33 by counting the number of rotations of a rotor that is in contact with the hoisting rope 33 and that rotates by following the move of the hoisting rope.

The hydraulic pump 42 is a hydraulic device that drives a plurality of drive devices including the first derricking winch 161, the second derricking winch 162, and the hoisting winch 163. The engine 41 drives the hydraulic pump 42. This means that the engine 41 is a power source for the hydraulic pump 42.

For example, the engine 41 is a diesel engine. Following a control signal outputted from the data processing device 6, the hydraulic control valve 43 allows pressurized oil to be supplied to each of the plurality of actuators 44.

The plurality of actuators 44 includes a plurality of hydraulic motors. The plurality of hydraulic motors includes a first derricking winch motor 441, a second derricking winch motor 442, and a hoisting winch motor 443.

The first derricking winch motor 441 is a motor for driving the first derricking winch 161. By causing the first derricking winch motor 441 to operate, the controller 8 causes the first derricking winch 161 to operate. When causing the first derricking winch motor 441 to operate, the controller 8 releases a negative brake of the first derricking winch 161.

The second derricking winch motor 442 is a motor for driving the second derricking winch 162. By causing the second derricking winch motor 442 to operate, the controller 8 causes the second derricking winch 162 to operate. When causing the second derricking winch motor 442 to operate, the controller 8 releases a negative brake of the second derricking winch 162.

The hoisting winch motor 443 is a motor for driving the hoisting winch 163. By causing the hoisting winch motor 443 to operate, the controller 8 causes the hoisting winch 163 to operate. When causing the hoisting winch motor 443 to operate, the controller 8 releases a negative brake of the hoisting winch 163.

The plurality of actuators 44 further include a slewing motor (not illustrated) that drives the upper slewing body 12 to slew. The slewing motor is a hydraulic motor.

By controlling the hydraulic control valve 43, the controller 8 controls the operation of the first derricking winch 161, the operation of the second derricking winch 162, and the operation of the hoisting winch 163.

The data processing device 6 outputs a control signal to a control target, such as the hydraulic control valve 43, according to an operation on the operation device 5 and/or a detection result from the state detection device 45. In addition, the data processing device 6 starts the engine 41 when a start operation is performed on a start operation device (not illustrated) included in the operation device 5. The data processing device 6 controls the display device 7.

Figure 3:
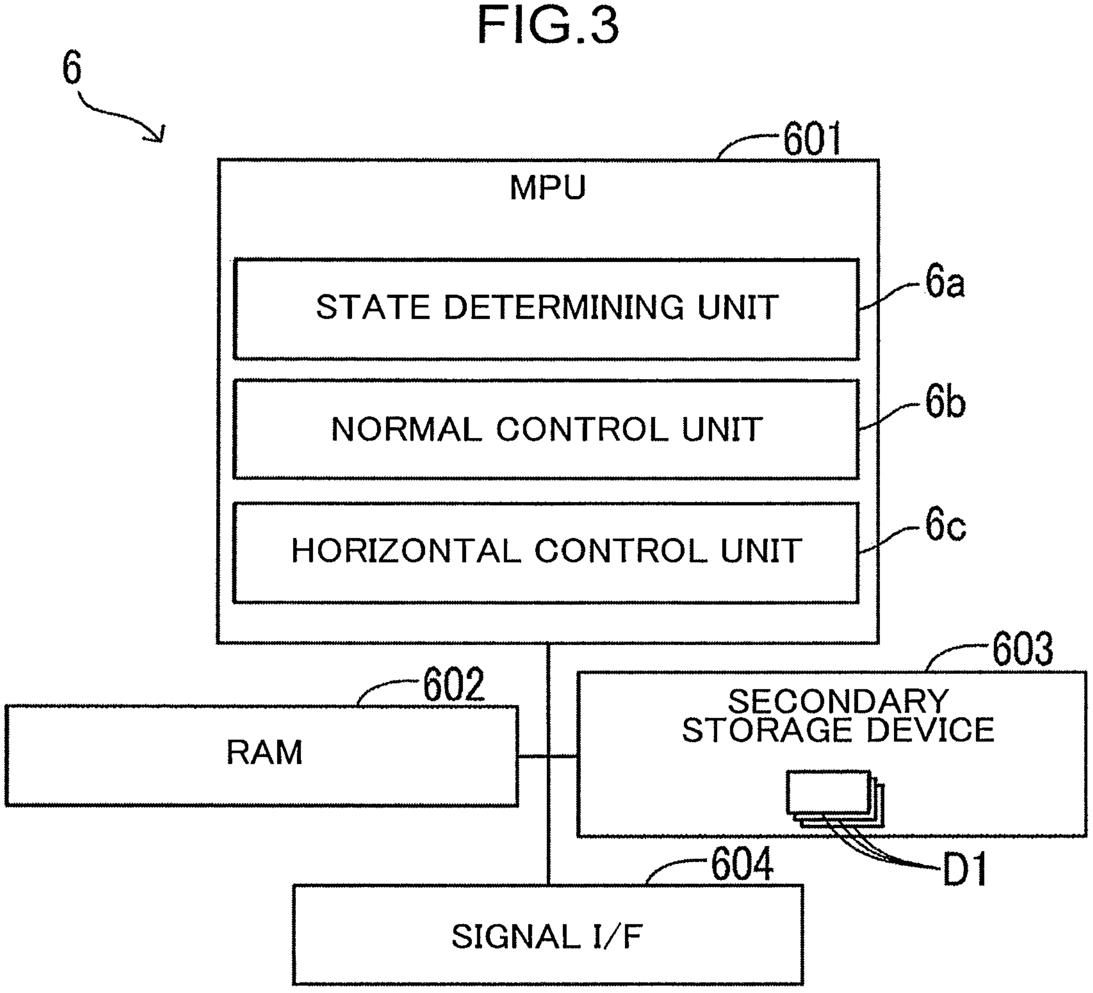
FIG. 3 is a block diagram showing a configuration of a data processing device of the crane according to the embodiment.

As shown in FIG. 3, the data processing device 6 includes a MPU 601 (micro processing unit), a RAM 602 (random access memory), a secondary storage 603, and a signal interface 604.

The RAM 602 is a computer-readable volatile storage. The secondary storage 603 is a computer-readable nonvolatile storage.

The MPU 601 is an example of a processor that performs various data processing and control by executing programs stored in advance in the secondary storage 603.

The RAM 602 is a volatile memory that temporarily stores the programs the MPU601 executes and data the MPU601 derives or refer to.

The secondary storage 603 stores in advance the programs the MPU601 executes and the data the MPU601 refer to. For example, the secondary storage 603 may be an EEPROM (electrically erasable programmable read-only memory), a flash memory, or another type of memory.

The signal interface 604 converts a detection signal from the state detection device 45 into digital data and transmits the digital data to the MPU601. In addition, the signal interface 604 converts a control instruction outputted from the MPU601, into a control signal, such as a current signal or a voltage signal, and outputs the control signal to a control target device.

As a result of execution of a predetermined operation program by the MPU601, the data processing device 6 works as a plurality of processing modules. For example, the plurality of processing modules include a state determination unit 6*a*, a normal control unit 6*b*, and a horizontal control unit 6*c* (see FIG. 3).

The state determination unit 6*a* determines a state of the crane 10, according to a detection result from the state detection device 45. For example, the state determination unit 6*a* derives a rope drooping length, which is the length of a drooping part of the hoisting rope 33. The dropping part is the part of hoisting rope 33 that droops from the front end of the jib 22.

For example, the state determination unit 6*a* derives the rope drooping length, based on a measurement result from the unwinding length measuring device 456 and on respective lengths of the boom 21 and the jib 22, the lengths being set in advance.

The state determination unit 6*a* may correct the rope drooping length, based on detection angles from the boom angle meter 454 and the jib angle meter 455.

The crane 10 may include a camera that images the drooping part of the hoisting rope 33. The camera may be set on, for example, the upper slewing body 12, or may be set on a different part of the crane 10. In this case, the state determination unit 6*a* can derive the rope drooping length by image processing on an image acquired by the camera.

Specifically, the state determination unit 6*a* extracts an image of the drooping part of the hoisting rope 33 from the image acquired by the camera. In addition, the state determination unit 6*a* derives the distance to the drooping part of the hoisting rope 33, based on respective lengths of the boom 21 and the jib 22 and on detection angles from the boom angle meter 454 and the jib angle meter 455.

An image processing device derives the rope drooping length, based on the length of the image of the drooping part of the hoisting rope 33 and on the distance to the drooping part of the hoisting rope 33.

The crane 10 may include a boom tension sensor (not illustrated) that detects tension acting on the first derricking rope 31. In this case, the load indicator 451 may be composed of the boom tension sensor, the jib tension sensor 452, and the state determination unit 6*a*.

The state determination unit 6*a* can derive the weight of the suspended load, based on detection values from the boom tension sensor, the jib tension sensor 452, the boom angle meter 454, and the jib angle meter 455.

The unwinding length measuring device 456 may measure respective unwinding lengths of the first derricking rope 31 and the second derricking rope 32. In this case, the state determination unit 6*a* can derive respective angles of the boom 21 and the jib 22 in accordance with a plurality of input parameters. The boom angle meter 454 and the jib angle meter 455 may not be provided, in which case the state determination unit 6*a* may derive respective angles of the boom 21 and the jib 22, instead. For example, when the jib 22 is fixed to the boom 21, the boom angle meter 454 may detect the angle of the boom 21 and the state determination unit 6*a* may derive the angle of the jib 22.

The plurality of input parameters include measurements of the unwinding lengths of the first derricking rope 31 and the second derricking rope 32. The plurality of input parameters further include respective lengths of the boom 21 and the jib 22, the lengths being set in advance.

In addition, the plurality of input parameters may include also respective weights and deflection coefficients of the boom 21 and the jib 22 and a detection value from the load indicator 451. In this case, the state determination unit 6*a* derives respective deflection amounts of the boom 21 and the jib 22, and corrects the result of deriving of respective angles of the boom 21 and the jib 22, according to the result of deriving of the deflection amounts.

The state determination unit 6*a* that derives the angle of the boom 21 may make up a part of the boom angle detector. Likewise, the state determination unit 6*a* that derives the angle of the jib 22 may make up a part of the jib angle detector.

When the control mode of the controller 8 is a normal mode, the normal control unit 6*b* controls the engine 41 and/or controls the operation of at least one of the plurality of actuators 44, according to an operation applied to one or two or more operation devices included in the operation device 5. In an initial state of the controller 8, the normal mode is selected as the control mode.

In the normal mode, the normal control unit 6*b* causes the first derricking winch 161 to operate according to an operation applied to the boom operation lever 511.

In addition, in the normal mode, the normal control unit 6*b* causes the second derricking winch 162 to operate according to an operation applied to the jib operation lever 512.

Furthermore, in the normal mode, the normal control unit 6*b* causes the hoisting winch 163 to operate according to an operation applied to the hoisting operation lever 513.

In the normal mode, when the boom 21 or the jib 22 turns upward, it causes the suspended load L0 to move slantly upward while moving closer to the upper slewing body 12. Likewise, when the boom 21 or the jib 22 turns downward, it causes the suspended load L0 to moves slantly downward while moving away from the upper slewing body 12.

The crane 10 can execute a tower operation, a first boom operation, or a second boom operation. In the tower operation, the boom 21 in its standing position is fixed, and the jib 22 turns upward or downward. In the first boom operation, an angle of the jib 22 against the boom 21 is fixed, and the boom 21 turns upward or downward. The boom 21 and the jib 22 are connected by a jib guy line (not illustrated). This fixes the angle of the jib 22 against the boom 21.

In the second boom operation, the hoisting rope 33 droops from the boom point sheave 210 attached to the front end of the boom 21. In the second boom operation, the boom 21 turns upward or downward.

Generally, when the crane 10 is used as the crane type in which no jib 22 is connected, the second boom operation is executed. It should be noted, however, that there may be a case where the second boom operation is executed as the jib 22 is fixed to the boom 21. For example, there is a case where when the crane 10 is used as the luffing type or the fixed jib type, the second boom operation is executed.

In the second boom operation, the drooping part of the hoisting rope 33 is the part of hoisting rope 33 that droops from the front end of the boom 21.

In the following description, a portion that turns upward and downward in each of the tower operation, the first boom operation, and the second boom operation is referred to as a derricking body 20 (see FIG. 1). In other words, the derricking body 20 is the portion that turns upward and downward and that is determined according to the type of the crane 10. Specifically, the derricking body 20 may include one or both of the boom 21, which is coupled to the main body (specifically, the upper slewing body 12) of the crane 10 so as to be capable of derricking, and the jib 22, which is coupled turnably to the front end of the boom 21. In other words, the derricking body 20 may be the boom 21 coupled to the main body of the crane 10 so as to be capable of derricking, may be the jib 22 coupled turnably to the front end of the boom 21, or may be both the boom 21 and the jib 22. The rope connected to the derricking body 20 is referred to as a derricking rope 30 (see FIG. 1).

A winch that changes an angle of the derricking body 20 is referred to as a derricking winch 160 (see FIG. 1). The derricking winch 160 winds up the derricking rope 30 or unwinds the derricking rope 30, thereby changing the angle of the derricking body 20. The operation direction of the derricking winch 160 is the direction of winding up the derricking rope 30 (winding operation direction) or the direction of unwinding the derricking rope 30 (unwinding operation direction). In other words, the operation direction of the derricking winch 160 is the direction of causing the derricking body 20 to turn upward or the direction of causing the derricking body 20 to turn downward.

The derricking winch 160 in the tower operation is the second derricking winch 162. The derricking winch 160 in the first boom operation or the second boom operation is the first derricking winch 161.

Hereinafter, an operation unit that receives an operation that instructs the operation of the derricking winch 160 is referred to as a derricking operation unit 510 (see FIG. 2). In the tower operation, the jib operation lever 512 is the derricking operation unit 510. In the first boom operation or the second boom operation, the boom operation lever 511 is the derricking operation unit 510.

A device that detects an angle of the derricking body 20 is referred to as an angle detector 450 (see FIG. 2). In this embodiment, the angle detector 450 is one or both of the boom angle meter 454 and the jib angle meter 455.

In the tower operation, the jib 22 is the derricking body 20, the second derricking rope 32 is the derricking rope 30, and the jib angle meter 455 is the angle detector 450.

In the first boom operation, both the boom 21 and the jib 22 are the derricking bodies 20, and the first derricking rope 31 is the derricking rope 30. In the first boom operation, an angle of the derricking body 20 is determined by a detection angle from the boom angle meter 454, a detection angle from the jib angle meter 455, and respective lengths of the boom 21 and the jib 22.

In the first boom operation, therefore, both the boom angle meter 454 and the jib angle meter 455 are the angle detectors 450.

In the second boom operation, the boom 21 is the derricking body 20, the first derricking rope 31 is the derricking rope 30, and the boom angle meter 454 is the angle detector 450.

The crane 10 may execute a horizontal transfer operation in the tower operation, the first boom operation, or the second boom operation. The horizontal transfer refers to horizontally transferring the suspended load L0. The horizontal transfer includes horizontal push transfer and horizontal pull transfer.

The horizontal push transfer refers to horizontally transferring the suspended load L0 in the direction of moving away from the upper slewing body 12. The horizontal pull transfer refers to horizontally transferring the suspended load L0 in the direction of moving closer to the upper slewing body 12.

In the crane 10, a horizontal transfer mode may be selected as the control mode. The horizontal transfer mode is the control mode for horizontal transferring the suspended load L0. The horizontal transfer mode is the control mode that is selected when the crane 10 carries out the horizontal transfer of the suspended load L0.

For example, when a mode transfer operation on the operation button 52 or the input device 53 is detected, the horizontal control unit 6*c* selects the horizontal transfer mode as the control mode. When a mode release operation on the operation button 52 or the input device 53 is detected, the normal control unit 6*b* selects the normal mode as the control mode. One or both of the mode transfer operation and the mode release operation may be an operation carried out by the operator.

When an operation on the derricking operation unit 510 is detected in a situation where the horizontal transfer mode is selected, the horizontal control unit 6*c* executes horizontal transfer control, which will be described later (see FIG. 4). The horizontal transfer control is the control for the horizontal transfer of the suspended load L0.

In the horizontal transfer control, the horizontal control unit 6*c* causes the derricking winch 160 and the hoisting winch 163 to operate in accordance with the operation on the derricking operation unit 510. The horizontal transfer control is preferable when the skill level of the operator is relatively low.

The operation speed of the hoisting winch 163 that is suitable for the horizontal transfer of the suspended load L0 varies depending on various work situations. Specifically, for example, the various work situations may include not only the angle of the derricking body 20 and the operation speed of the derricking winch 160 but also the rotating speed of the engine 41 that drives the hydraulic pump 42 and the weight of the suspended load L0.

Therefore, when the horizontal control unit 6*c* executes control for the horizontal transfer in accordance with pre-adjusted control parameters, the height of the suspended load L0 may not be kept at a constant level.

Figure 4:
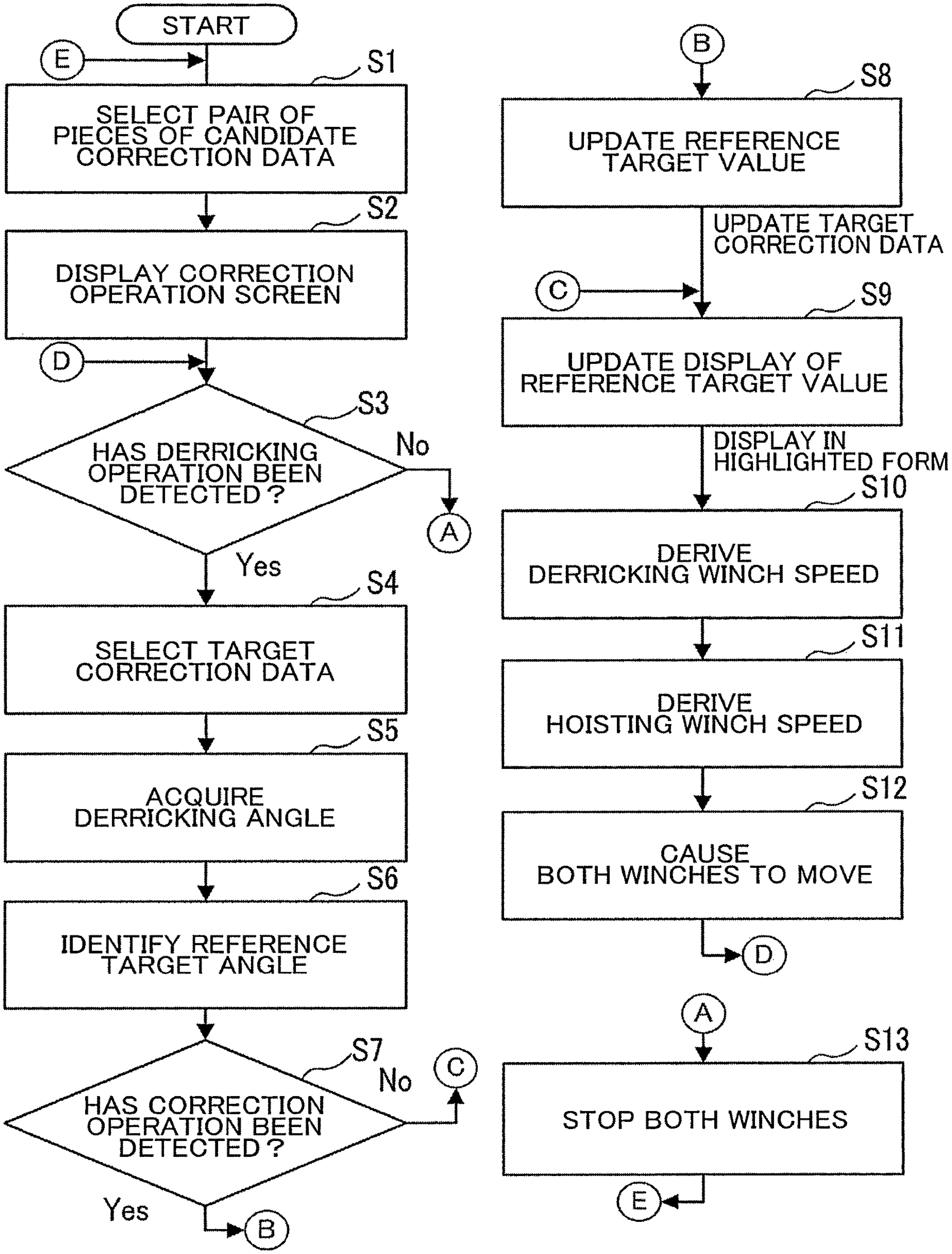
FIG. 4 is a flowchart showing an example of a procedure of horizontal transfer control by the crane according to the embodiment.

In this embodiment, the horizontal control unit 6*c* executes the horizontal transfer control by, for example, a procedure shown in FIG. 4. As a result, the operation speed of the hoisting winch 163 in the horizontal transfer control can be adjusted easily according to various work situations.

In this embodiment, the secondary storage 603 shown in FIG. 3 stores at least one piece of registered correction data D1. The registered correction data D1 includes data of a plurality of registered values D11 associated with a plurality of section angle ranges D10 (see FIG. 5). Each of the plurality of section angle ranges D10 represents a section of the movable range of the derricking body 20. In this manner, the plurality of section angle ranges D10 are set by dividing the movable range of the derricking body 20 into different sections.

Each of the plurality of registered values D11 represents a degree of correction for adjusting the operation speed of the hoisting winch 163. In this embodiment, each of the plurality of registered values D11 represents a degree of correction for adjusting a speed ratio of the hoisting winch 163 to the derricking winch 160.

Figure 5:
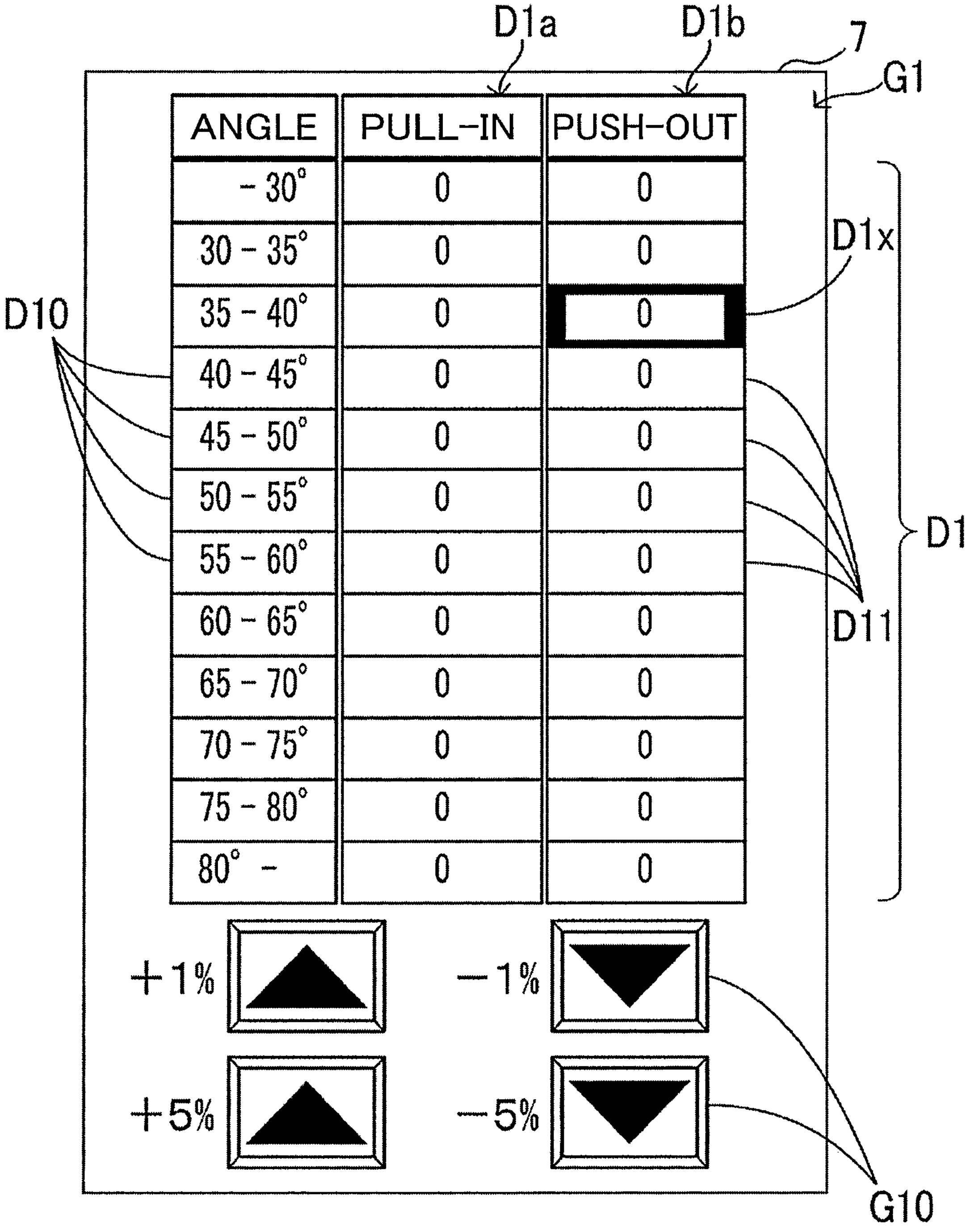
FIG. 5 depicts an example of a correction operation screen of the crane according to the embodiment.

For example, each of the plurality of registered values D11 may be set to 0 as an initial value (see FIG. 5). Some or all of the plurality of registered values D11, however, may be set to non-zero values as initial values.

For example, the secondary storage 603 may store pieces of registered correction data D1. The pieces of registered correction data D1 may include pieces of registered correction data corresponding to operation directions of the derricking winch 160. Specifically, as shown in FIG. 5, the pieces of registered correction data D1 may include at least one piece of pull-in correction data D1*a* that is used when the operation direction of the derricking winch 160 is the winding operation direction, and at least one piece of push-out correction data D1*b* that is used when the operation direction of the derricking winch 160 is the unwinding operation direction.

The pull-in correction data D1*a* includes a plurality of registered values D11 for a case where the derricking winch 160 operates in a direction of causing the derricking body 20 to turn upward. In other words, the pull-in correction data D1*a* includes a plurality of registered values D11 for the horizontal pull transfer.

The push-out correction data D1*b*, on the other hand, includes a plurality of registered values D11 for a case where the derricking winch 160 operates in a direction of causing the derricking body 20 to turn downward. In other words, the push-out correction data D1*b* includes a plurality of registered values D11 for the horizontal push transfer.

In this embodiment, the pieces of registered correction data D1 may include pieces of registered correction data corresponding to the rotating speed of the engine 41. Specifically, the pieces of registered correction data D1 may include pieces of pull-in correction data D1*a* corresponding to the rotating speed of the engine 41, and pieces of push-out correction data D1*b* corresponding to the rotating speed of the engine 41.

In this embodiment, the engine 41 is configured to change its rotating speed into multiple levels. The pieces of pull-in correction data D1*a* may be set in correspondence to the multiple levels, and the pieces of push-out correction data D1*b* may be set in correspondence to the multiple levels. Specifically, when the rotating speed of the engine 41 can be changed to two levels, i.e., a high speed level and a low speed level, the pieces of pull-in correction data D1*a* may include pull-in correction data D1*a* that is used when the rotating speed of the engine 41 is high, and pull-in correction data D1*a* that is used when the rotating speed of the engine 41 is low. In the same manner, when the rotating speed of the engine 41 can be changed to two levels, i.e., the high speed level and the low speed level, the pieces of push-out correction data D1*b* may include push-out correction data D1*b* that is used when the rotating speed of the engine 41 is high, and push-out correction data D1*b* that is used when the rotating speed of the engine 41 is low.

Further, the pieces of registered correction data D1 may include pieces of registered correction data D1 corresponding to the presence or absence of the jib 22. Specifically, the pieces of registered correction data D1 may include pieces of pull-in correction data D1*a* corresponding to the presence or absence of the jib 22, and pieces of push-out correction data D1*b* corresponding to the presence or absence of the jib 22. In this case, the pieces of pull-in correction data D1*a* include pull-in correction data D1*a* that is used when the jib 22 is coupled to the boom 21, and pull-in correction data D1*a* that is used when the jib 22 is not coupled to the boom 21. In the same manner, the pieces of push-out correction data D1*b* include push-out correction data D1*b* that is used when the jib 22 is coupled to the boom 21, and push-out correction data D1*b* that is used when the jib 22 is not coupled to the boom 21.

When the jib 22 is coupled to the boom 21, the crane 10 can execute the tower operation or the first boom operation. When the jib 22 is not coupled to the boom 21, on the other hand, the crane 10 can execute the second boom operation.

Further, the pieces of registered correction data D1 may include pieces of registered correction data D1 corresponding to the weight of the suspended load L0. Specifically, the pieces of registered correction data D1 may include pieces of pull-in correction data D1*a* corresponding to the weight of the suspended load L0, and pieces of push-out correction data D1*b* corresponding to the weight of the suspended load L0. Specifically, for example, a plurality of levels related to the weight of the suspended load L0 may be set in advance. In this case, the pieces of pull-in correction data D1*a* may include pull-in correction data D1*a* that is used when the weight of the suspended load L0 is at a high level and pull-in correction data D1*a* that is used when the weight of the suspended load L0 is at a low level. In the same manner, the pieces of push-out correction data D1*b* may include push-out correction data D1*b* that is used when the weight of the suspended load L0 is at a high level, and push-out correction data D1*b* that is used when the weight of the suspended load L0 is at a low level.

It should be noted that a difference that results depending on whether the horizontal transfer is the horizontal pull transfer or the horizontal push transfer is one of factors for variations in the height of the suspended load L0 in the horizontal transfer. Also, the rotating speed of the engine 41 and the weight of the suspended load L0 each constitute one of factors for variations in the height of the suspended load L0 in the horizontal transfer.

The horizontal control unit 6*c* specifics an operating state of the crane 10 when the horizontal transfer mode is selected. In this embodiment, this operation state is one of the tower operation, the first boom operation, and the second boom operation.

For example, the horizontal control unit 6*c* may specify the operation state according to an operation selection action on the input device 53.

The horizontal control unit 6*c* may automatically specify the operation state. For example, the horizontal control unit 6*c* can specify the operation state according to information on the presence or absence of the jib 22, the information being inputted in advance through the input device 53, and the status of an operation on the boom operation lever 511 and the jib operation lever 512.

Furthermore, the horizontal control unit 6*c* specifies the derricking operation unit 510 and the angle detector 450 that correspond to the specified operation state.

[Horizontal Transfer Control]

Hereinafter, an example of a procedure of the horizontal transfer control will be described with reference to a flowchart shown in FIG. 4.

The horizontal control unit 6*c* executes the horizontal transfer control when the horizontal transfer mode is selected. The horizontal transfer control is an example of a process of implementing a crane control method for the horizontal transfer of the suspended load L0.

In the following description, S1, S2, and the like are reference signs denoting a plurality of steps executed in the horizontal transfer control. In the procedure of the horizontal transfer control, the horizontal control unit 6*c* starts from a process of step S1.

<Step S1>

In step S1, the horizontal control unit 6*c* selects a pair of candidate correction data corresponding to the rotating speed of the engine 41, from pieces of registered correction data D1.

One of the pair of candidate correction data is pull-in correction data D1*a*, and the other of the pair of candidate correction data is push-out correction data D1*b*.

In other words, in step S1, the pull-in correction data D1*a* corresponding to the rotating speed of the engine 41 and the push-out correction data D1*b* corresponding to the rotating speed of the engine 41 are selected.

The pieces of registered correction data D1 may include pieces of pull-in correction data D1*a* corresponding to the rotating speed of the engine 41 and the weight of the suspended load L0 and pieces of push-out correction data D1*b* corresponding to the rotating speed of the engine 41 and the weight of the suspended load L0. In this case, in step S1, the horizontal control unit 6*c* may select a pair of candidate correction data corresponding to the rotating speed of the engine 41 and a detection load detected by the load indicator 451, from the pieces of registered correction data D1.

After executing the process of step S1, the horizontal control unit 6*c* executes a process of step S2.

<Step S2>

In step S2, the horizontal control unit 6*c* causes the display device 7 to display a correction operation screen G1 (see FIG. 5).

The correction operation screen G1 includes a plurality of registered values D11 included in the pair of candidate correction data. On the correction operation screen G1, the plurality of registered values D11 are displayed in association with a plurality of section angle ranges D10. Specifically, pull-in correction data D1*a* of the pair of candidate correction data includes a plurality of registered values D11, and these registered values D11 are displayed in association with a plurality of section angle ranges D10. Similarly, push-out correction data D1*b* of the pair of candidate correction data includes a plurality of registered values D11, and these registered values D11 are displayed in association with a plurality of section angle ranges D10.

The correction operation screen G1 further includes a plurality of correction operation icons G10 displayed on a touch panel making up the input device 53. Each of the correction operation icons G10 is an icon that receives a correction operation for specifying a specified value for correcting the operation speed of the hoisting winch 163. In a specific example shown in FIG. 5, the plurality of correction operation icons G10 includes a correction operation icon G10 that receives a correction operation for specifying (inputting) a specified value (e.g., "+1%" or "+5%") for correction of increasing the operation speed of the hoisting winch 163, and a correction operation icon G10 that receives a correction operation for specifying (inputting) a specified value (e.g., "−1%" or "−5%") for correction of decreasing the operation speed of the hoisting winch 163.

In this embodiment, the specified value represents a degree to which a reference target value D1$x$, which will be described later, is corrected (for example, a correction amount representing an amount of correction of the reference target value D1$x$). The reference target value D1$x$ is used to correct a reference speed ratio representing a ratio of the operation speed of the hoisting winch 163 to the operation speed of the derricking winch 160, which reference speed ratio will be described later.

The plurality of correction operation icons G10 are an example of a correction operation unit that receives a correction operation for specifying the specified value. In other words, the touch panel making up the input device 53 is an example of the correction operation unit.

However, the correction operation unit is not limited to such an input device as the touch panel, and may be a different input device, such as a keyboard, a portable information terminal, or a voice input device. The input device serving as the correction operation unit is configured to be capable of receiving a correction operation of specifying (inputting) a specified value for correction of increasing the operation speed of the hoisting winch 163 and receiving a correction operation of specifying (inputting) a specified value for correction of decreasing the operation speed of the hoisting winch 163.

After executing the process of step S2, the horizontal control unit 6$c$ executes a process of step S3.

<Step S3>

In step S3, when a derricking operation is detected (Yes in step S3), the horizontal control unit 6$c$ executes a process of step S4. The derricking operation is an operation on the derricking operation unit 510.

In step S3, when a derricking operation is not detected (No in step S3), the horizontal control unit 6$c$ executes a process of step S13.

<Step S4>

In step S4, the horizontal control unit 6$c$ selects one of the pair of candidate correction data, as target correction data, according to the direction of the operation on the derricking operation unit 510, the operation having been detected in step S3.

The direction of the operation on the derricking operation unit 510 indicates the operation direction of the derricking winch 160. In other words, out of the pair of candidate correction data, the horizontal control unit 6$c$ selects the candidate correction data (registered correction data) corresponding to the operation direction of the derricking winch 160, as the target correction data.

After executing the process of step S4, the horizontal control unit 6$c$ executes a process of step S5.

<Step S5>

In step S5, the horizontal control unit 6$c$ acquires a derricking angle, which is a detection angle detected by the angle detector 450, from the angle detector 450.

After executing the process of step S5, the horizontal control unit 6$c$ executes a process of step S6.

<Step S6>

In step S6, the horizontal control unit 6$c$ specifies data of the reference target value D1$x$ corresponding to the detected derricking angle, from among data of the plurality of registered values D11 in the selected target correction data (see FIG. 5).

In the example shown in FIG. 5, the plurality of registered values D11 are associated with the plurality of section angle ranges D10. In other words, the plurality of section angle ranges D10 are associated respectively with the registered values D11 in one-to-one correspondence. In this case, the horizontal control unit 6$c$ specifies one registered value D11 corresponding to the section angle range D10 to which the detected derricking angle belongs, as the reference target value D1$x$. In the specific example of FIG. 5, the detected derricking angle belongs to a section angle range D10 "35°-40°", and therefore the registered value D11 associated with the section angle range D10 "35°-40°" is specified as the reference target value D1$x$.

Each of the plurality of registered values D11 may be associated with a boundary value of each of the plurality of section angle ranges D10. The boundary value of each section angle range D10 may be a lower limit value or an upper limit value of the section angle range D10. In this case, one registered value D11 associated with the boundary value of the section angle range D10 to which the derricking angle belongs is specified as the reference target value D1$x$.

After executing the process of step S6, the horizontal control unit 6$c$ executes a process of step S7.

<Step S7>

In step S7, when the correction operation on the input device 53 is detected (Yes in step S7), the horizontal control unit 6$c$ executes a process of step S8.

When the correction operation on the input device 53 is not detected in step S7 (No in step S7), the horizontal control unit 6$c$ executes a process of step S9.

For example, when a state of none of the correction operation icons G10 being operated has shifted to a state of one of the correction operation icons G10 being operated, the input device 53 detects the correction operation. In other words, when one of the plurality of correction operation icons G10 has been operated, the input device 53 detects the correction operation.

In addition, the input device 53 may detect the correction operation continuously during a period in which one of the plurality of correction operation icons G10 is operated. Specifically, for example, the input device 53 may detect the correction operation continuously when a state of the operator's finger touching one correction operation icon G10 continues.

<Step S8>

In step S8, the horizontal control unit 6$c$ updates the original reference target value D1$x$ specified in step S6 to a value given by reflecting the specified value in the original reference target value D1$x$.

The specified value reflected in the reference target value D1$x$ is the specified value corresponding to the correction operation detected in step S7. In other words, the specified value reflected in the reference target value D1$x$ is the specified value specified by the correction operation detected in step S7.

In this embodiment, when updating the reference target value D1$x$, the horizontal control unit 6$c$ updates also data of the reference target value D1$x$ in the target correction data stored in the secondary storage 603. Specifically, when the specified value is reflected in the original reference target value D1$x$, the horizontal control unit 6$c$ updates the original reference target value D1$x$ in the target correction data stored in the secondary storage 603 to a value in which the specified value is reflected, and stores the updated value in the secondary storage 603.

When the correction operation is detected in step S7, the updated reference target value D1$x$ may be, for example, a value given by adding the specified value to the original reference target value D1$x$.

When the correction operation is not detected in step S7, on the other hand, the reference target value D1$x$ is not updated.

After executing the process of step S8, the horizontal control unit 6$c$ executes the process of step S9.

<Step S9>

In step S9, the horizontal control unit 6$c$ updates the reference target value D1$x$ displayed on the correction operation screen G1 to the updated value of step S8.

When the correction operation is not detected in step S7, however, the displayed form of the reference target value D1$x$ is not updated substantially.

The horizontal control unit 6$c$ executes a process by which the plurality of registered values D11 are displayed on the display device 7 and some of the registered values D11 that correspond to a derricking angle are displayed in a highlighted form on the display device 7. In this embodiment, when updating the displayed form of the reference target value D1$x$ on the display device 7, the horizontal control unit 6$c$ executes a process by which the reference target value D1$x$ is displayed in a highlighted form on the display device 7 (see FIG. 5).

For example, the horizontal control unit 6$c$ may cause the display device 7 to display the reference target value D1$x$ in a color different from the color of other registered values D11 different from the reference target value D1$x$.

After executing the process of step S9, the horizontal control unit 6$c$ executes a process of step S10.

<Step S10>

In step S10, the horizontal control unit 6$c$ derives a derricking winch speed corresponding to an operation amount of an operation on the derricking operation unit 510. The derricking winch speed represents an operation speed of the derricking winch 160.

By the process of step S10, the derricking winch speed is derived, which is substantially proportional to the operation amount of the operation on the derricking operation unit 510.

After executing the process of step S10, the horizontal control unit 6$c$ executes a process of step S11.

<Step S11>

In step S11, the horizontal control unit 6$c$ derives a hoisting winch speed corresponding to the derricking winch speed derived in step S10. The hoisting winch speed represents an operation speed of the hoisting winch 163.

Hereinafter, a specific example of a method for deriving the hoisting winch speed will be described.

The horizontal control unit 6$c$ applies the derricking angle obtained in step S5 to a predetermined calculation formula or a look-up table, thereby deriving a reference speed ratio representing a ratio of the hoisting winch speed to the derricking winch speed (step S11). In other words, the horizontal control unit 6$c$ derives the reference speed ratio, using the derricking angle and the calculation formula or the lookup table.

The reference speed ratio may be derived based on, for example, a general formula, such as a trigonometric function, to which the derricking angle and pieces of known information are applied. For example, the pieces of known information may include the length of the derricking body 20, the derricking angle, and information on the position of the derricking winch 160 and information on a ratio of the drum diameter of the derricking winch 160 to the drum diameter of the hoisting winch 163.

When the first boom operation is executed, the horizontal control unit 6$c$ may derive the reference speed ratio on the assumption that the angle of the jib 22 against the boom 21 is kept constant.

Subsequently, the horizontal control unit 6$c$ corrects the reference speed ratio with the reference target value D1$x$ to derive an applied speed ratio (step S11). The applied speed ratio is a ratio of the hoisting winch speed to the derricking winch speed. The applied speed ratio is a speed ratio used to derive the hoisting winch speed.

When the correction operation is not detected in step S7, the reference target value D1$x$ used to derive the applied speed ratio is the original reference target value D1$x$ specified from the target correction data.

When the correction operation has been detected in step S7, on the other hand, the reference target value D1$x$ used to derive the applied speed ratio is a value given by correcting the original reference target value D1$x$ specified from the target correction data with the specified value (a value given by reflecting the specified value in the original reference target value D1$x$) (see step S8).

Subsequently, the horizontal control unit 6$c$ derives the hoisting winch speed by multiplying the derricking winch speed by the applied speed ratio (step S11).

After executing the process of step S11, the horizontal control unit 6$c$ executes a process of step S12.

The process of step S11 will be further described with reference to a specific example. In this embodiment, the horizontal control unit 6$c$ derives the applied speed ratio by correcting the reference speed ratio using the reference target value D1$x$. No specific limitation is placed as to the way the reference target value D1$x$ is used for deriving the applied speed ratio. The following is a specific example of use of the reference target value D1$x$.

The horizontal control unit 6$c$ may derive the applied speed ratio by correcting the reference speed ratio according to a degree of correction represented by the reference target value D1$x$ (e.g., the initial value "0"). Specifically, the horizontal control unit 6$c$ may derive the applied speed ratio by multiplying the reference speed ratio by a value (corresponding value) corresponding to the degree of correction represented by the reference target value D1$x$ or adding the value to the reference speed ratio. Specifically, as in the specific example of FIG. 5, when the specified value is a percentage value like "%" and the reference target value D1$x$, which is corrected with the specified value, is too a percentage value, the value (corresponding value) corresponding to the degree of correction represented by the reference target value D1$x$ may be "reference target value D1$x$+1". Specifically, when the reference target value D1$x$ is, for example, a value given by correcting the initial value "0" to a specified value "+5%", the corresponding value may be "0.05+1". In this case, the horizontal control unit 6$c$ derives the applied speed ratio by multiplying the reference speed ratio by the corresponding value "reference target value D1$x$+1".

More specifically, as shown in FIG. 5, when a derricking angle detected by the angle detector 450 belongs to the section angle range D10 "35°-40°", the horizontal control unit 6$c$ derives the reference speed ratio, using a predetermined map (e.g., a calculation formula or lookup table) and the section angle range D10 "35°-40°". It is assumed that the derived reference speed ratio is, for example, "0.6".

When the correction operation is not detected in step S7, the reference target value D1*x* is the original reference target value D1*x* (e.g., the initial value "0") specified from the target correction data. When a correction operation of specifying (inputting) a specified value of, for example, "+5%" is detected in step S7, on the other hand, the reference target value D1*x* is the value given by correcting the initial value "0" to the specified value "+5%".

Thus, the horizontal control unit 6*c* derives the applied speed ratio by multiplying the reference speed ratio by the corresponding value ("reference target value D1*x*+1") corresponding to the degree of correction represented by the reference target value D1*x*. The horizontal control unit 6*c* then derives the hoisting winch speed by multiplying the derricking winch speed by the applied speed ratio.

Specifically, when the correction operation is not detected in step S7, the horizontal control unit 6*c* derives the applied speed ratio by multiplying the reference speed ratio by "1.00" (applied speed ratio=0.6×1.00=0.6). In this case, the reference speed ratio and the applied speed ratio are the same. At this time, when the derricking winch speed is, for example, "100 mm/s", the horizontal control unit 6*c* derives the hoisting winch speed by multiplying the derricking winch speed "100 mm/s" by the applied speed ratio "0.6" (the hoisting winch speed=100×0.6=60 mm/s).

When a correction operation of specifying (inputting) a specified value of, for example, "+5%" is detected in step S7, the horizontal control unit 6*c* derives the applied speed ratio by multiplying the reference speed ratio by "1.05" (applied speed ratio=0.6×1.05=0.63). At this time, when the derricking winch speed is, for example, "100 mm/s", the horizontal control unit 6*c* derives the hoisting winch speed by multiplying the derricking winch speed "100 mm/s" by the applied speed ratio "0.63" (the hoisting winch speed=100×0.63=63 mm/s).

The operator of the crane 10 is allowed to input correction operations repeatedly to the correction operation unit (that is, the correction operation icons G10) until the operator determines that a shift in transfer of the suspended load from horizontal transfer is corrected. Hence the operator can easily adjust the operation speed of the hoisting winch in executing control for horizontal transfer of the suspended load.

<Step S12>

In step S12, the horizontal control unit 6*c* causes the derricking winch 160 to operate at the derricking winch speed and causes the hoisting winch 163 to operate at the hoisting winch speed.

The processes of steps S4 to S12 are executed when the derricking operation is carried out on the derricking operation unit 510. The processes of steps S4 to S12 are executed at a cycle of, for example, less than 1 second. Therefore, the derricking winch 160 and the hoisting winch 163 start operating substantially at the same moment at which the derricking operation is detected.

In step S12, feedback control over hydraulic equipment corresponding to the derricking winch 160 and the hoisting winch 163 may be executed. In this case, the speeds derived in steps S10 and S11 are target speeds set in the feedback control.

When the correction operation is carried out on the input device 53 in a situation where the derricking operation is going on, the processes of steps S8 to S12 are executed. As a result, the speed of the hoisting winch 163, which operates in accordance with the derricking operation, is immediately corrected according to the correction operation.

After executing the process of step S12, the horizontal control unit 6*c* executes the process of step S3. The horizontal control unit 6*c* thus repeats the processes of step S3 and subsequent steps.

<Step S13>

In step S13, the horizontal control unit 6*c* stops the derricking winch 160 and the hoisting winch 163 from operating.

After executing the process of step S13, the horizontal control unit 6*c* executes the process of step S1. The horizontal control unit 6*c* thus repeats the processes of step S1 and subsequent steps.

When a mode different from the horizontal transfer mode is selected as the control mode, the horizontal control unit 6*c* ends the horizontal transfer control.

After executing the process of step S13, the horizontal control unit 6*c* may execute the processes of steps S7 to S9 and then proceed to step S1. Through this procedure, even when the derricking operation is not carried out, the target correction data can be updated by the correction operation.

In the horizontal transfer control, the processes of step S1 and steps S4 to S12 are an example of parallel winch control by which the derricking winch 160 and the hoisting winch 163 are operated in parallel. The parallel winch control is executed when an operation on the derricking operation unit 510 is detected in a situation where the horizontal transfer mode is selected.

In the parallel winch control, the horizontal control unit 6*c* causes the derricking winch 160 to operate at a speed corresponding to an operation amount of an operation on the derricking operation unit 510 (see steps S10 and S12).

In the parallel winch control, the horizontal control unit 6*c* acquires the derricking angle when needed, and specifics data of the reference target value D1*x* corresponding to the derricking angle, from data of the plurality of registered values D11 (see steps S5 and S6).

In the parallel winch control, the horizontal control unit 6*c* derives the reference speed ratio in accordance with the derricking angle, the reference speed ratio representing the ratio of the hoisting winch speed to the derricking winch speed (see step S11).

In the parallel winch control, the horizontal control unit 6*c* derives the applied speed ratio by correcting the reference speed ratio with the reference target value D1*x* (see step S11).

In the parallel winch control, the horizontal control unit 6*c* derives the hoisting winch speed according to the derricking winch speed and the applied speed ratio, and causes the hoisting winch 163 to operate at the hoisting winch speed (see steps S11 and S12).

In the horizontal transfer control, the processes of steps S8 and S11 are an example of a correction process. The horizontal control unit 6*c* executes the correction process when the correction operation is detected in a situation where the parallel winch control is executed.

The horizontal control unit 6*c* executes a speed correction process in the correction process. The speed correction process is a process of correcting the reference target value D1*x*, which is used for deriving the hoisting winch speed in the parallel winch control, according to the specified value specified by the correction operation (see step S8).

The horizontal control unit 6*c* executes the speed correction process in a correction period corresponding to a point of time at which the correction operation is detected. The horizontal control unit 6*c* executes the correction process in the correction period corresponding to the point of time at which the correction operation is detected. In this embodiment, the correction period is a period in which the derricking angle belongs to one target angle range that is one of the plurality of section angle ranges D10.

The target angle range is a section angle range D10 including the derricking angle at the point of time at which the correction operation is detected, the section angle range D10 being among the plurality of section angle ranges D10. The target angle range is one section angle range D10 corresponding to the reference target value D1*x* at the point of time at which the correction operation is detected, the section angle range D10 being among the plurality of section angle ranges D10.

As described above, in step S7, the correction operation is detected when the state of none of the correction operation icons G10 being operated has shifted to the state of one of the correction operation icons G10 being operated.

After the process of step S8 is executed, the horizontal control unit 6*c* executes the process of steps S4 to S6 again when detection of the derricking operation is continued.

At execution of the process of S6, when the derricking angle belongs to the target angle range, the reference target value D1*x* updated in previous step S8 is specified. Thus, speed correction based on the specified value at a point of time of detection of the correction operation is reflected in the hoisting winch speed derived in step S11.

At execution of the process of S6, when the derricking angle does not belong to the target angle range, a new reference target value D1*x* is specified, which is different from the reference target value D1*x* updated in previous step S8. As a result, speed correction based on the specified value at a point of time of detection of the correction operation is not reflected in the hoisting winch speed derived in step S11.

Therefore, the correction period according to this embodiment is a period in which the derricking angle belongs to the target angle range.

In the above horizontal transfer control, the process of step S8 is an example of a data updating process. The data updating process is a process of updating data of the reference target value D1*x* corresponding to the correction period, the date being in the secondary storage 603.

In the data updating process, the horizontal control unit 6*c* updates the data of the reference target value D1*x* to data corrected with the specified value specified by the correction operation. In other words, the horizontal control unit 6*c* executes the data updating process of updating the reference target value D1*x* to a value corrected in accordance with the specified value specified by the correction operation.

The processes of steps S1 and S4 in the horizontal transfer control are an example of a first data selection process executed by the horizontal control unit 6*c*. The first data selection process is a process of selecting one of the pieces of registered correction data D1 as the target correction data, according to the operation direction of the derricking winch 160.

The processes of steps S1 and S4 in the horizontal transfer control are also an example of a second data selection process executed by the horizontal control unit 6*c*. The second data selection process is a process of selecting one of the pieces of registered correction data D1 as the target correction data, according to the rotating speed of the engine 41.

The processes of steps S1 and S4 in the horizontal transfer control are also an example of a third data selection process executed by the horizontal control unit 6*c*. The third data selection process is a process of selecting one of the pieces of registered correction data D1 as the target correction data, according to a detection load detected by the load indicator 451.

The horizontal control unit 6*c* refers to or updates the target correction data during execution of the parallel winch control or the data updating process (see steps S6, S8, S9, and S11).

When the parallel winch control is being executed, the horizontal control unit 6*c* causes the display device 7 to execute a correction value display process in step S2 and step S9.

The correction value display process is a process of displaying the plurality of registered values D11 and displaying some of the registered values D11 that correspond to the derricking angle in a highlighted form (see FIG. 5). This allows the operator to easily know registered values corresponding to the current angle of the derricking body 20, the registered values being among the plurality of registered values D11.

By adopting this embodiment, the operator of the crane 10 can easily adjust the operation speed of the hoisting winch 163 in the horizontal transfer control, according to various work situations or crane types.

First Application Example

A first application example of the horizontal transfer control will then be described.

In the first application example, the input device 53 can detect the correction operation continuously during a period in which an operation on one of the plurality of correction operation icons G10 continues.

In the first application example, the correction period may be an operation continued period from a point of time at which the correction operation is detected to a point of time at which the correction operation is no longer detected. For example, when the input device 53 detects a long press operation on one of the plurality of correction operation icons G10, a period during which the long press operation is kept detected may be the correction period.

In the first application example, the horizontal control unit 6*c* may not update the target correction data in the secondary storage 603 in step S8 of the horizontal transfer control. In the first application example, the horizontal control unit 6*c* may update the target correction data in the secondary storage 603 after the correction period is set.

For example, the horizontal control unit 6*c* temporarily stores an updated reference target value D1*x* for each of one or more specific angle ranges to which the derricking angle belongs during the operation continued period, the specific angle ranges being among the plurality of section angle ranges D10.

Further, when a predetermined updating condition holds, the horizontal control unit 6*c* updates data of the reference target value D1*x* corresponding to the one or more specific angle ranges in the secondary storage 603.

For example, the updating condition may include a first updating condition that the correction operation or the derricking operation is no longer detected. The updating condition may include a second updating condition that the direction of the derricking operation has changed when the correction operation is going on. For example, the updating condition may be a logical sum of the first updating condition and the second updating condition. A process of updating the data of the reference target value D1*x* in the first application example is too an example of the data updating process.

Adopting the first application example offers the same effect as the case of adopting the horizontal transfer control shown in FIG. 4 offers.

Second Application Example

A second application example of the horizontal transfer control will then be described.

In the second application example, the controller 8 capable of executing the horizontal transfer control may be provided as a remote controller capable of wireless communication with the crane 10. The controller 8 is not necessarily mounted on the crane 10, and may be disposed at a remote place separated away from the crane 10.

Adopting the second application example offers the same effect as the case of adopting the crane 10.

The invention claimed is:

1. A crane control method for horizontally transferring a suspended load, using a crane, the crane including:

a derricking body;

a derricking rope connected to the derricking body;

a derricking winch that winds up the derricking rope or unwinds the derricking rope to change an angle of the derricking body;

an angle detector that detects an angle of the derricking body;

a hook for suspending the suspended load therefrom;

a hoisting rope connected to the hook, the hoisting rope drooping from a front end of the derricking body; and a hoisting winch that winds up the hoisting rope or unwinds the hoisting rope to change a length of a part of the hoisting rope that droops from the front end of the derricking body, a controller capable of controlling the derricking winch and the hoisting winch, the controller including:

a derricking operation unit that receives an operation that instructs operation of the derricking winch;

a correction operation unit that receives a correction operation of specifying a specified value for correcting an operation speed of the hoisting winch; and a storage that is a nonvolatile storage and that stores at least one piece of registered correction data including a plurality of registered values associated with a plurality of section angle ranges, the plurality of registered values each representing a degree of correction for adjusting an operation speed of the hoisting winch and the plurality of section angle ranges being set by dividing a movable range of the derricking body into different sections, the crane control method comprising:

executing, by the controller, parallel winch control of causing the derricking winch and the hoisting winch to operate when an operation on the derricking operation unit is detected in a situation where a control mode for horizontal transfer of the suspended load is selected; and executing, by the controller, a correction process when the correction operation is detected in a situation where the parallel winch control is executed, wherein the parallel winch control includes:

causing, by the controller, the derricking winch to operate at a speed corresponding to an amount of operation on the derricking operation unit;

acquiring, by the controller, a derricking angle that is a detection angle detected by the angle detector and specifying a reference target value corresponding to the derricking angle, from among the plurality of registered values;

deriving, by the controller, a reference speed ratio according to the derricking angle, the reference speed ratio representing a ratio of an operation speed of the hoisting winch to an operation speed of the derricking winch;

deriving, by the controller, an applied speed ratio by correcting the reference speed ratio with the reference target value; and causing, by the controller, the hoisting winch to operate at a speed corresponding to an operation speed of the derricking winch and to the applied speed ratio, and the correction process includes:

executing, by the controller, a speed correction process in a correction period corresponding to a point of time at which the correction operation is detected, the speed correction process being a process of correcting the reference target value used for deriving an operation speed of the hoisting winch in the parallel winch control, in accordance with the specified value specified by the correction operation; and executing, by the controller, a data updating process of updating data of the reference target value, the data corresponding to the correction period in the storage, to data corrected with the specified value specified by the correction operation.

2. The crane control method according to claim 1, wherein the derricking body is a boom coupled to a main body of the crane so as to be capable of derricking, or a jib connected turnably to a front end of the boom, or both the boom and the jib.

3. The crane control method according to claim 1, wherein the correction period is a period in which the derricking angle belongs to one target angle range among the plurality of section angle ranges, and the target angle range is a section angle range including the derricking angle at a point of time at which the correction operation is detected, the section angle range being among the plurality of section angle ranges.

4. The crane control method according to claim 1, wherein the correction period is a period from a point of time at which the correction operation is detected to a point of time at which the correction operation is no longer detected.

5. The crane control method according to claim 1, wherein the at least one piece of registered correction data includes pieces of registered correction data corresponding to an operation direction of the derricking winch, the controller selects registered correction data corresponding to an operation direction of the derricking winch from the pieces of registered correction data, as target correction data, and the controller refers to or updates the target correction data in execution of the parallel winch control or the correction process.

6. The crane control method according to claim 1, wherein the crane includes:

a hydraulic device that drives the derricking winch and the hoisting winch; and an engine that is a power source for the hydraulic device, the engine capable of changing a rotating speed, the at least one piece of registered correction data includes pieces of registered correction data corresponding to a rotating speed of the engine, the controller selects registered correction data corresponding to a rotating speed of the engine from the pieces of registered correction data, as target correction data, and the controller refers to or updates the target correction data in execution of the parallel winch control or the correction process.

7. The crane control method according to claim 1, wherein the crane includes a load detector that detects a weight of the suspended load, the at least one piece of registered correction data includes pieces of registered correction data corresponding to the weight of the suspended load, the controller selects registered correction data corresponding to a detection load detected by the load detector from the pieces of registered correction data, as target correction data, and the controller refers to or updates the target correction data in execution of the parallel winch control or the data updating process.

8. The crane control method according to claim 1, wherein the crane includes a display device, and when the parallel winch control is being executed, the controller executes a process by which the plurality of registered values are displayed on the display device and some of the registered values that correspond to the derricking angle are displayed in a highlighted form on the display device.

9. A crane comprising:

a derricking body;

a derricking rope connected to the derricking body;

a derricking winch that winds up the derricking rope or unwinds the derricking rope to change an angle of the derricking body;

an angle detector that detects an angle of the derricking body;

a hook for suspending a suspended load therefrom;

a hoisting rope connected to the hook, the hoisting rope drooping from a front end of the derricking body;

a hoisting winch that winds up the hoisting rope or unwinds the hoisting rope to change a length of a part of the hoisting rope that droops from the front end of the derricking body; and a controller that controls the derricking winch and the hoisting winch, wherein the controller includes:

a derricking operation unit that receives an operation that instructs operation of the derricking winch;

a correction operation unit that receives a correction operation of specifying a specified value for correcting an operation speed of the hoisting winch; and a storage that is a nonvolatile storage and that stores at least one piece of registered correction data including a plurality of registered values associated with a plurality of section angle ranges, the plurality of registered values each representing a degree of correction for adjusting an operation speed of the hoisting winch and the plurality of section angle ranges being set by dividing a movable range of the derricking body into different sections, the controller executes parallel winch control of causing the derricking winch and the hoisting winch to operate when an operation on the derricking operation unit is detected in a situation where a control mode for horizontal transfer of the suspended load is selected, and executes a correction process when the correction operation is detected in a situation where the parallel winch control is executed, in the parallel winch control, the controller causes the derricking winch to operate at a speed corresponding to an amount of operation on the derricking operation unit;

acquires a derricking angle that is a detection angle detected by the angle detector and specifies a reference target value corresponding to the derricking angle, from among the plurality of registered values;

derives a reference speed ratio according to the derricking angle, the reference speed ratio representing a ratio of an operation speed of the hoisting winch to an operation speed of the derricking winch;

derives an applied speed ratio by correcting the reference speed ratio with the reference target value; and causes the hoisting winch to operate at a speed corresponding to an operation speed of the derricking winch and to the applied speed ratio, and in the correction process, the controller executes a speed correction process in a correction period corresponding to a point of time at which the correction operation is detected, the speed correction process being a process of correcting the reference target value used for deriving an operation speed of the hoisting winch in the parallel winch control, in accordance with the specified value specified by the correction operation; and executes a data updating process of updating data of the reference target value, the data corresponding to the correction period in the storage, to data corrected with the specified value specified by the correction operation.

10. The crane according to claim 9, wherein the derricking body is a boom coupled to a main body of the crane so as to be capable of derricking, or a jib connected turnably to a front end of the boom, or both the boom and the jib.

* * * * *